United States Patent [19]

Ono et al.

[11] 3,819,393
[45] June 25, 1974

[54] CEMENT EXPANDING AGENT

[76] Inventors: Yoshizo Ono, No. 230; Tsutomu Mizunuma, 111, Ohaza-Ohmi, both of, Nishikubiki-gun, Japan

[22] Filed: June 21, 1972

[21] Appl. No.: 265,036

[30] Foreign Application Priority Data
June 26, 1971 Japan.............................. 46-46505

[52] U.S. Cl.................................. 106/314, 106/89
[51] Int. Cl............................................ C04b 13/00
[58] Field of Search .............. 106/314, 89, 104, 109

[56] References Cited
UNITED STATES PATENTS

| | | | |
|---|---|---|---|
| 3,155,526 | 11/1964 | Klein...................................... | 106/89 |
| 3,251,701 | 5/1966 | Klein...................................... | 106/89 |
| 3,303,037 | 2/1967 | Klein...................................... | 106/89 |
| 3,510,326 | 5/1970 | Miki....................................... | 106/89 |
| 3,666,515 | 5/1972 | Nakagawa............................. | 106/314 |

*Primary Examiner*—Delbert E. Gantz
*Assistant Examiner*—James W. Hellwege
*Attorney, Agent, or Firm*—Sughrue, Rothwell, Mion, Zinn & Macpeak

[57] ABSTRACT

A calcium sulfoaluminate series cement expanding agent having a specific particle size distribution. This cement expanding agent is not influenced by the variation of curing condition and can develop a high expandability in the concrete.

1 Claim, 4 Drawing Figures

A  B  C

CEMENT EXPANDING AGENT

The present invention relates to a calcium sulfoaluminate series cement expanding agent (hereinafter abridged as CSA). Conventional cement shrinks and causes cracks during the hardening and drying steps. In order to obviate these drawbacks, various cement expanding agents have been disclosed. For example, Japanese Pat. No. 514,199 (German Pat. No. 1,571,437) discloses a cement expanding agent having a regulated particle size distribution, which is produced by burning a raw mixture having a chemical composition of $CaO/Al_2O_3$ being from 2 to 6 and $CaSO_4/Al_2O_3$ being from 2 to 4 in a molar ratio to prepare a sintered body and pulverizing the sintered body so as to have a particle size distribution which contains less than 10 percent (hereinafter, "percent" means percent by weight) of particles having a size smaller than $44\mu$, more than 70 percent of particles having a size of 44 to $250\mu$, and less than 20 percent of particles having a size larger than $250\mu$. However, this cement expanding agent still has such a drawback that the restricted expansion coefficient is considerably decreased due to the variation of curing condition.

The object of the present invention is to provide a novel CSA having no above described drawback. After various investigations, the inventors have found that CSA having the specific particle size distribution as defined hereinafter is not influenced by the variation of curing condition between the curing in water or in vapour and the curing in air and can develop a high expandability in the resulting concrete or mortar.

That is, the present invention provides a cement expanding agent produced by burning limestone, alumina and gypsum in such a mixing ration that the resulting sintered body has the following mineral composition:

| | |
|---|---|
| $3CaO\cdot3Al_2O_3\cdot CaSO_4$ | 10 to 40%, |
| free CaO | 10 to 20% and |
| free $CaSO_4$ | 20 to 60%, | and pulverizing the sintered body and adjusting the particle size distribution of the pulverized sintered body to the following ranges:

| | |
|---|---|
| smaller than $44\mu$ | 30 to 60%, |
| 88 to $149\mu$ | 10 to 40% and |
| larger than $250\mu$ | less than 20%. |

The present invention will be explained in more detail with reference to the following experimental example.

Experimental Example

Lime, gypsum and bauxite were compounded in a molar ration of $CaO/Al_2O_3 = 4$ and $CaSO_4/Al_2O_3 = 3$ to prepare a raw mixture, and the raw mixture was fused at 1,200°C in an electric furnace. The fused body was cooled and pulverized by means of an air swept type grinder to prepare four kinds of CSA particles having the following particle sizes, (a) particles having a size of smaller than $44\mu$ (hereinafter abridged as $\alpha$-size particles), (b) particles having a size of 44 to $88\mu$ (hereinafter abridged as $\beta$-size particles), (c) particles having a size of 88 to $149\mu$ (hereinafter abridged as $\gamma$-size particles) and (d) particles having a size of 149 to $250\mu$ (hereinafter abridged as $\delta$-size particles), and 13 percent of each of the four kinds of CSA particles was compounded with cement so that the total amount of the CSA particles and the cement was 100 percent. The free expansion coefficient of the resulting mortar was determined by the use of a mortar sample defined in JIS R 5201, and the result is shown in FIG. 1.

The above mentioned air swept type grinder will be explained hereinafter with reference to FIG. 4.

The fused and cooled body is fed to a ball mill 2 by the air from a blower in and pulverized. The pulverized product is fed to a separator 3 from the ball mill 2 through a circuit 18 by the air from the blower 1 to effect a primary separation. The coarse particles are further fed to a separator 4, where an additional separation is effected and the separated fine particles are fed to a shifter 6 through a circuit 10 and in the shifter a screening is made. The screened particles are taken out through a circuit 14. The particles remaining on the sieve are returned back to the ball mill 2 through a circuit 15. The fine particles separated at the separator 4 are fed to a cyclone 5 through a circuit 11 and the particles collected in this cyclone are combined through a circuit 13 with the fine particles from the circuit 14 and discharged as a product. The other part particles in the cyclone 5 are returned back to a ball mill through the circuits 12 and 16. In the closed circuit, the ultra fine particles are collected at a back filter 7 through a circuit 17 and a part of air is purged out from the system.

A seen from FIG. 1, although the above described four kinds of CSA particles are produced from the same fused body, they exhibit considerably different behaviors in the free expansion depending upon the particle size. Particularly, it has hitherto been considered that as the particle size of the CSA is smaller, the particles hydrate more rapidly and expand more rapidly than particles having a larger size However, it has been surprisingly found from the above described result that although $\alpha$-size particles are very fine particles, the $\alpha$-size particles hydrate considerably slower than $\gamma$-size particles. This phenomenon has been firstly confirmed by the inventors. In the cement expanding agent of the present invention, $\alpha$-size particles and $\gamma$-size particles occupy the main portion so as to utilize the opposite properties of the slowly expandable $\alpha$-size particles and rapidly expandable $\gamma$-size particles, and other particles occupy some portion, whereby the CSA function can be fully developed. Namely, $\alpha$-size particles occupy 30 to 60 percent, $\gamma$-size particles occupy 10 to 40 percent and particles having a size of larger than $250\mu$ occupy less than 20 percent in the cement expanding agent of the present invention.

The term "CSA function" herein used means such a function that the expanding velocity due to hydration of CSA and the strength-developing velocity due to hydration of cement are well balanced, and such properties are not diminished mutually in the course of initial curing stage and fully developed, and the decrease of the restricted expansion coefficient is small owing to the variation of curing condition, for example, between the curing in water and the curing in air.

Then, $\alpha$-size and $\gamma$-size particles, which are main components of the cement expanding agent according to the present invention, were compounded alone or in admixture with cement to prepare mortars. FIG. 2 shows a relation between the free expansion coefficient and the age of the mortars. It has been found from FIG. 2 that the slow expandability of α-size particles and the rapid expandability of γ-size particles are developed corresponding to the mixing ratio of the two particles.

When the amount of α-size particles is less than 30 percent and the amount of γ-size particles is more than 40 percent, the rapid expandability of the γ-size particles increases and the initial expansion of mortar is large. As the result, the balance between the initial expansion of mortar and the hydration of cement is lost to cause creep in the mortar, and the expandability of the mortar under a restricted state is lost due to the creep. While, when the amount of α-size particles is more than 60 percent and the amount of γ-size particles is less than 10 percent, the expandability of mortar is highly influenced by the curing in air after the curing in water. For example, when the mortar is cured in water at 20°C for 3 days and then immediately cured in air of 50 percent RH at 20°C, the mortar shrinks and cracks are formed in the mortar. Further, when the amount of coarse particles having a size of larger than 250μ is more than 20 percent, water penetrates very slowly into the interior of the particle at the hydration to delay formation of ettringite ($3CaO\cdot Al_2O_3\cdot 3CaSO_4\cdot 32H_2O$), and moreover cement forms a colloidal film on the surface of the particle and unreacted coarse particles remain. As the result, for example, when a mortar is cured in vapour, the balance between the hydration velocity of cement and that of CSA is lost and the mortar expands over a long period of time, and accordingly the mortar is unstable. In the cement expanding agent of the present invention, the maximum diameter of particles is less than about 350μ. Particles used in this experiment contained 3 to 5 percent of particles having a size of about 350μ.

As seen from FIG. 1, β-size particles and δ-size particles show small expansion. When they are compounded with the α-size particles, γ-size particles and particles having a size of larger than 250μ, if the above specified particle size distribution and the above defined ranges of the latter three kinds of particles are maintained, the characteristic property of the cement expanding agent of the present invention is not deteriorated.

As the cement to be compound with the cement expanding agent of the present invention, various mixed cements other than Portland cement may be used.

The mixture ratio of the cement expanding agent to a cement is 5 – 15 percent by weight of said agent and 95 – 85 percent by weight of the cement. Beyond this range, the efficient expandability cannot be attained.

For a better understanding of the present invention, reference is taken to the accompanying drawings, wherein.

The following example is given in illustration of this invention and is not intended as a limitation thereof.

EXAMPLE 1

Residue resulted from acetylene generation, burned white bauxite and anhydrous gypsum were mixed in a molar ratio of $CaO/Al_2O_3 = 4$ and $CaSO_4/Al_2O_3 = 3$, and the resulting mixture was burned at 1,250°C in a rotary kiln to obtain a CSA clinker. The CSA clinker was pulverized in a closed circuit air swept type grinder to obtain a cement expanding agent, which had a mineral composition and a particle size distribution as shown in the followinng Table 1. The resulting cement expanding agent was compounded with cement in a recipe as shown in the following Table 2 to prepare a mortar, and the restricted expansion coefficient of the mortar was determined to obtain a result as shown in the following Table 3. As a control, a mortar is prepared from a cement expanding agent of the above described Japanese Pat. No. 514,199. The mineral composition and particle size distribution of this expanding agent and the restricted expansion coefficient of the mortar are also shown in Tables 1 and 3.

Table 1

|  |  | Cement expanding agent | |
|---|---|---|---|
|  |  | Present invention | Japanese Patent No. 514,199 |
| Molar ratio of starting materials | $CaO:Al_2O_3:CaSO_4$ | 4:1:3 | 4:1:3 |
| Mineral composition | $3CaO\cdot 3Al_2O_3\cdot CaSO_4$ | 23.6 | 23.6 |
|  | free CaO | 19.5 | 19.5 |
|  | free $CaSO_4$ | 47.0 | 47.0 |
| Particle size distribution % | (α) less than 44μ | 40.2 | 5.8 |
|  | (β) 44 ~ 88μ | 13.6 |  |
|  | ( ) 88 ~ 149μ | 28.7 | 93.6 |
|  | (δ) 149 ~ 250μ | 11.0 |  |
|  | 250 ~ 350μ | 6.5 | 0.6 |

Table 2

| FM agent | Flow value (m/m) | Air (%) | W/C (%) | S/C | Water (Kg/m³) | Cement (Kg/m³) | Cement expanding (Kg/m³) | (%) | Sand (Kg/m³) |
|---|---|---|---|---|---|---|---|---|---|
| 2.6 | 210 | 4 | 45 | 2.00 | 274 | 608 | 70 | 10.3 | 1,216 |

Table 3

| Curing | Age (day) | Present invention | Japanese Patent No. 514,199 |
|---|---|---|---|
| 20°C, in water | 1 | 0.02 | 0.03 |
| | 2 | 0.04 | 0.06 |
| | 4 | 0.06 | 0.10 |
| | 7 | 0.09 | 0.11 |
| 20°C, in air (50% RH) | 14 | 0.11 | 0.11 |
| | 15 | 0.11 | 0.10 |
| | 21 | 0.10 | 0.08 |
| | 28 | 0.10 | 0.07 |
| Percentage of decreasing restricted expansion coefficient (%) | | 9.1 | 36.3 |

(Restricted expansion coefficient (%))

Note 1:
A mortar sample for the determination of restricted expansion coefficient was prepared in a steel ratio of 1.0 percent according to the procedure shown in FIG. 3.

Figure 1:
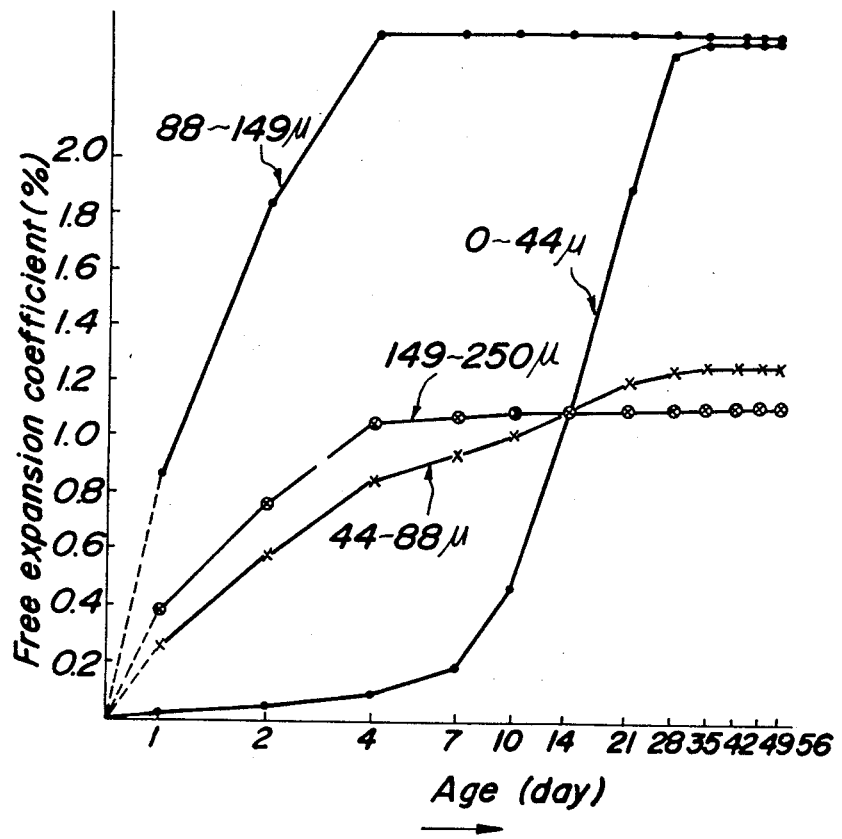
FIG. 1 is a graph showing a relation between the free expansion coefficient of mortar and the particle size of CSA particles.
Figure 2:
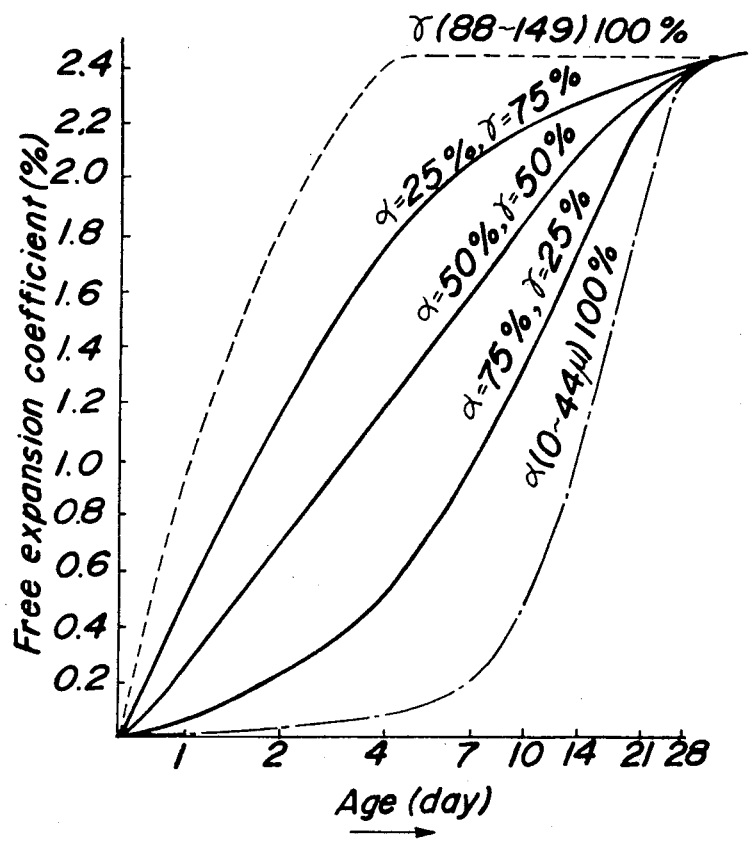
FIG. 2 is a graph showing a relation between the free expansion coefficient and the age of mortar.
Figure 3:
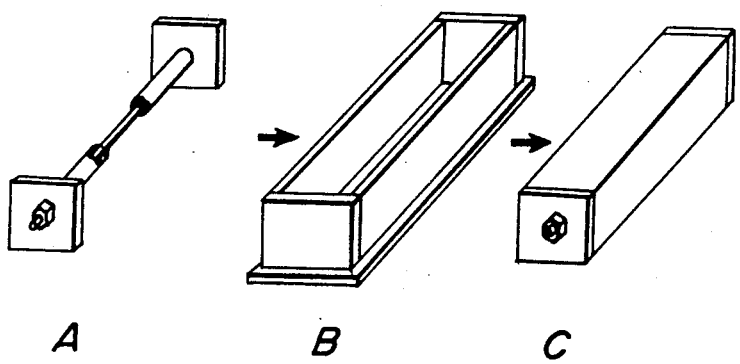
FIG. 3 shows a procedure for the production of a mortar sample to be used for the determination of restricted expansion coefficient.
Figure 4:
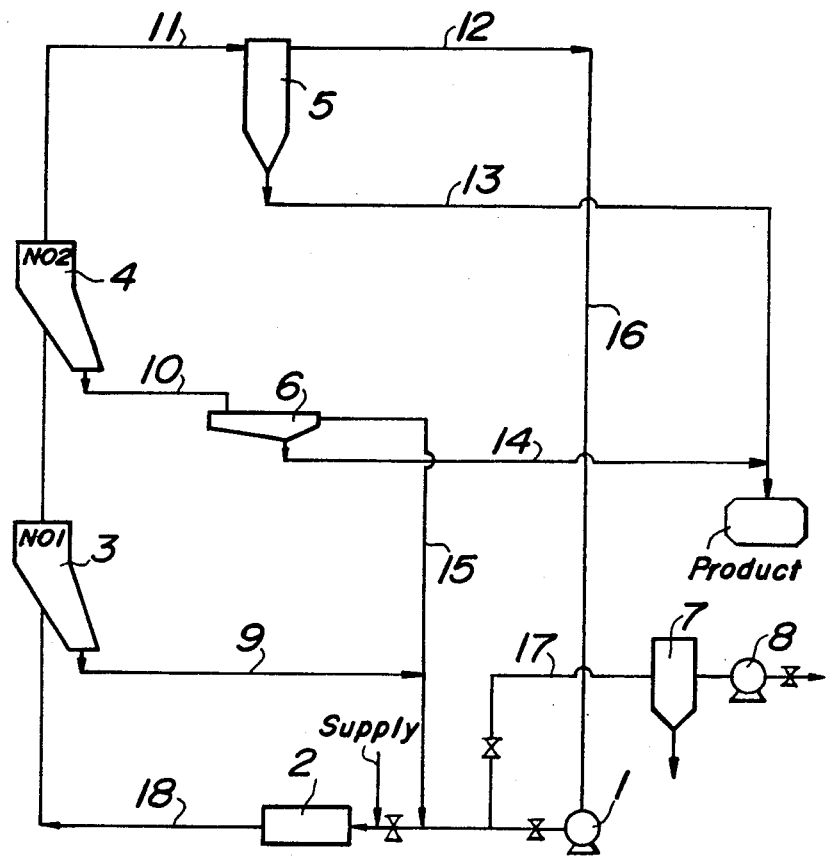
FIG. 4 is a flow sheet showing an air swept type grinder.

The procedure shown in FIG. 3 is as follows. A frame A manufactured by bolting restricting iron plates of 100 × 100 × 15 mm to both ends of a PC steel rod of 270 mm length sheathed with a vinyl pipe is placed in a vessel B defined by JIS A—1125.

Previously prepared mortar is introduced into the vessel B, left to stand for 24 hours in a room at a temperature of 21° ± 3°C under a wet stage and taken out from the vessel B according to JIS R 5201 to obtain a mortar sample C.

Note 2:
Percentage of decreasing restricted expansion coefficient was calculated from the following formula:

$$\text{Percentage of decreasing restricted expansion coefficient (\%)} = \frac{\text{expansion coefficient (14 day)} - \text{expansion coefficient (28 day)}}{\text{expansion coefficient (14 day)}} \times 100$$

One embodiment of chemical compositions of the cement expansion agent according to the present invention is shown in the following Table 4.

Table 4
Chemical composition (%) of the cement expanding agent of the present invention

| Ig.loss | Insol. | $SiO_2$ | $Al_2O_3$ | $Fe_2O_3$ | CaO | MgO | $SO_3$ | Free CaO | Total |
|---|---|---|---|---|---|---|---|---|---|
| 1.0 | 2.0 | 3.2 | 10.9 | 1.2 | 52.5 | 0.6 | 28.3 | 17.2 | 99.7 |

As seen from Table 3, when a mortar sample was firstly cured in water and then in air, the percentage of decreasing restricted expansion coefficient in the case of the conventional expanding agent is 36.3 percent, but that in the case of the expanding agent of the present invention is only 9.1 percent. This proves that the CSA function can be greatly improved by regulating the particle size of CSA according to the present invention.

What is claimed is:
1. A cement expanding agent produced by burning raw materials in such a mixing ratio that the resulting sintered body has the following mineral composition:

| | |
|---|---|
| $3CaO \cdot 3Al_2O_3 \cdot CaSO_4$ | 10 to 40% by weight, |
| free CaO | 10 to 20% by weight, and |
| free $CaSO_4$ | 20 to 60% by weight, | and pulverizing the sintered body and adjusting the particle size distribution of the pulverized sintered body to the following ranges:

| | |
|---|---|
| smaller than 44μ | 30 to 60% by weight, |
| 88 to 149μ | 10 to 40% by weight, and |
| larger than 250μ | less than 20% by weight. |

* * * * *

UNITED STATES PATENT OFFICE
CERTIFICATE OF CORRECTION

Patent No. 3,819,393     Dated June 25, 1974

Inventor(s)     Yoshizo Ono et al

It is certified that error appears in the above-identified patent and that said Letters Patent are hereby corrected as shown below:

In The Heading:

The Assignee's name was omitted. Should be:

--DENKI KAGAKU KOGYO KABUSHIKI KAISHA --

Signed and Sealed this sixth Day of January 1976

[SEAL]

Attest:

RUTH C. MASON
*Attesting Officer*

C. MARSHALL DANN
*Commissioner of Patents and Trademarks*